United States Patent
Wahrlich

(10) Patent No.: US 9,429,674 B2
(45) Date of Patent: Aug. 30, 2016

(54) DISCRIMINATION METHOD OF A METAL DETECTOR BASED ON TIME CONSTANT SPECTRUM

(71) Applicant: Minelab Electronics Pty Limited, Torrensville (AU)

(72) Inventor: Philip Shane Wahrlich, Torrensville (AU)

(73) Assignee: Minelab Electronics Pty Limited, Torrensville, South Australia (AU)

( * ) Notice: Subject to any disclaimer, the term of this patent is extended or adjusted under 35 U.S.C. 154(b) by 0 days.

(21) Appl. No.: 14/429,110

(22) PCT Filed: Apr. 24, 2014

(86) PCT No.: PCT/AU2014/000465
§ 371 (c)(1),
(2) Date: Mar. 18, 2015

(87) PCT Pub. No.: WO2014/172750
PCT Pub. Date: Oct. 30, 2014

(65) Prior Publication Data
US 2016/0041292 A1 Feb. 11, 2016

(30) Foreign Application Priority Data
Apr. 26, 2013 (AU) .................. 2013901457

(51) Int. Cl.
*G01V 3/165* (2006.01)
*G01V 3/10* (2006.01)
(52) U.S. Cl.
CPC .................. *G01V 3/165* (2013.01); *G01V 3/10* (2013.01)
(58) Field of Classification Search
CPC ............ G01V 3/10; G01V 3/02; G01V 3/38; G01V 99/00; G01V 3/165
USPC ..................................................... 324/326–329
See application file for complete search history.

(56) References Cited

U.S. PATENT DOCUMENTS 5,506,506 A * 4/1996 Candy .................... G01V 3/105
324/232
7,791,345 B2 9/2010 Candy
(Continued)

FOREIGN PATENT DOCUMENTS

AU 4796390 A 7/1990
AU 200179376 A1 4/2002
(Continued)

OTHER PUBLICATIONS

Abeynayake et al., A Kalman filter-based approach to detect landmines from metal detector data; 2001; IEEE; pp. 2492-2494.*
(Continued)

*Primary Examiner* — Jay Patidar
(74) *Attorney, Agent, or Firm* — The Webb Law Firm

(57) ABSTRACT

A method for detecting a target in a soil using a metal detector, including: generating a transmit magnetic field for transmission into the soil based on a transmit signal; receiving a receive magnetic field; providing a receive signal induced by the receive magnetic field; processing the receive signal for producing a set of data which has effects of signals from the soil reduced therein or removed therefrom; producing at least two components of a form of at least one time constant spectrum based on the set of data; and producing, at least one indicator output signal based on the at least two components for indicating the presence and/or identity of the target when the target is within, an influence of the transmit magnetic field.

19 Claims, 11 Drawing Sheets

(56) References Cited

U.S. PATENT DOCUMENTS

| | | |
|---|---|---|
| 2002/0027438 A1 | 3/2002 | Ott et al. |
| 2004/0119475 A1* | 6/2004 | Earle .................. G01V 3/15 324/329 |
| 2010/0148960 A1 | 6/2010 | Candy |
| 2012/0212227 A1 | 8/2012 | Candy |

FOREIGN PATENT DOCUMENTS

| | | |
|---|---|---|
| AU | 200179439 A1 | 4/2002 |
| AU | 200179440 A1 | 4/2002 |
| AU | 2004290091 B2 | 5/2005 |
| AU | 2007272230 B2 | 1/2008 |
| AU | 2007304831 A1 | 4/2008 |
| AU | 2009262370 B2 | 12/2009 |
| AU | 2009243482 A1 | 7/2010 |
| WO | 2009155648 A1 | 12/2009 |
| WO | 2011011820 A1 | 2/2011 |

OTHER PUBLICATIONS

Wei et al., "Landmine Detection Using the Discrete Spectrum of Relaxation Frequencies", IGARSS, 2011, pp. 834-837.

Wei et al., "Estimation and Application of Discrete Spectrum of Relaxations for Electromagnetic Induction Responses", IGARSS, 2009 pp. II-105-II-108.

* cited by examiner

|       | $\tau_0$ | $\tau_1$ | $\tau_2$ | $\tau_3$ | $\tau_4$ | $\tau_5$ | $\tau_6$ | $\tau_7$ | $\tau_8$ | $\tau_9$ | $\tau_{10}$ | $\tau_{11}$ | $\tau_{12}$ | $\tau_{13}$ | $\tau_{14}$ |
|---|---|---|---|---|---|---|---|---|---|---|---|---|---|---|---|
| $f_1$ | 0.63 | 0.69 | 0.77 | 0.84 | 0.92 | 1.00 | 1.08 | 1.16 | 1.23 | 1.28 | 1.32 | 1.34 | 1.32 | 1.26 | 1.16 |
| $f_2$ | 0.46 | 0.51 | 0.56 | 0.62 | 0.68 | 0.74 | 0.80 | 0.86 | 0.91 | 0.96 | 1.00 | 1.02 | 1.02 | 0.99 | 0.93 |
| $f_3$ | -0.21 | -0.23 | -0.25 | -0.27 | -0.29 | -0.31 | -0.32 | -0.33 | -0.33 | -0.31 | -0.29 | -0.25 | -0.19 | -0.11 | -0.01 |
| $f_4$ | -0.12 | -0.13 | -0.15 | -0.16 | -0.18 | -0.20 | -0.21 | -0.23 | -0.25 | -0.26 | -0.28 | -0.28 | -0.29 | -0.29 | -0.27 |
| $f_5$ | 0.08 | 0.09 | 0.10 | 0.10 | 0.11 | 0.12 | 0.12 | 0.13 | 0.13 | 0.12 | 0.11 | 0.10 | 0.07 | 0.04 | 0.00 |
| $f_6$ | 0.16 | 0.18 | 0.20 | 0.22 | 0.25 | 0.27 | 0.29 | 0.32 | 0.35 | 0.37 | 0.39 | 0.41 | 0.42 | 0.43 | 0.43 |
| $f_7$ | 0.42 | 0.47 | 0.52 | 0.58 | 0.64 | 0.70 | 0.77 | 0.84 | 0.91 | 0.98 | 1.04 | 1.10 | 1.14 | 1.17 | 1.17 |

|       | $\tau_{15}$ | $\tau_{16}$ | $\tau_{17}$ | $\tau_{18}$ | $\tau_{19}$ | $\tau_{20}$ | $\tau_{21}$ | $\tau_{22}$ | $\tau_{23}$ | $\tau_{24}$ | $\tau_{25}$ | $\tau_{26}$ | $\tau_{27}$ | $\tau_{28}$ | $\tau_{29}$ |
|---|---|---|---|---|---|---|---|---|---|---|---|---|---|---|---|
| $f_1$ | 1.00 | 0.77 | 0.48 | 0.13 | -0.29 | -0.76 | -1.28 | -1.81 | -2.34 | -2.86 | -3.33 | -3.74 | -4.06 | -4.29 | -4.42 |
| $f_2$ | 0.83 | 0.68 | 0.48 | 0.23 | -0.06 | -0.40 | -0.78 | -1.18 | -1.60 | -2.00 | -2.39 | -2.73 | -3.02 | -3.25 | -3.39 |
| $f_3$ | 0.12 | 0.27 | 0.44 | 0.62 | 0.81 | 1.00 | 1.17 | 1.31 | 1.41 | 1.46 | 1.45 | 1.37 | 1.24 | 1.05 | 0.81 |
| $f_4$ | -0.25 | -0.22 | -0.17 | -0.11 | -0.03 | 0.06 | 0.16 | 0.27 | 0.39 | 0.51 | 0.63 | 0.74 | 0.83 | 0.91 | 0.97 |
| $f_5$ | -0.06 | -0.13 | -0.20 | -0.29 | -0.38 | -0.47 | -0.56 | -0.64 | -0.71 | -0.75 | -0.77 | -0.76 | -0.71 | -0.62 | -0.51 |
| $f_6$ | 0.41 | 0.38 | 0.33 | 0.26 | 0.18 | 0.07 | -0.06 | -0.20 | -0.35 | -0.51 | -0.68 | -0.85 | -1.01 | -1.16 | -1.29 |
| $f_7$ | 1.15 | 1.09 | 0.98 | 0.83 | 0.63 | 0.37 | 0.07 | -0.29 | -0.68 | -1.10 | -1.55 | -2.00 | -2.44 | -2.87 | -3.27 |

|       | $\tau_{30}$ | $\tau_{31}$ | $\tau_{32}$ | $\tau_{33}$ | $\tau_{34}$ | $\tau_{35}$ | $\tau_{36}$ | $\tau_{37}$ | $\tau_{38}$ | $\tau_{39}$ | $\tau_{40}$ | $\tau_{41}$ | $\tau_{42}$ | $\tau_{43}$ | $\tau_{44}$ |
|---|---|---|---|---|---|---|---|---|---|---|---|---|---|---|---|
| $f_1$ | -4.42 | -4.31 | -4.08 | -3.73 | -3.28 | -2.73 | -2.10 | -1.41 | -0.70 | 0.03 | 0.73 | 1.37 | 1.94 | 2.41 | 2.75 |
| $f_2$ | -3.45 | -3.41 | -3.28 | -3.06 | -2.74 | -2.33 | -1.86 | -1.33 | -0.76 | -0.18 | 0.39 | 0.92 | 1.40 | 1.80 | 2.11 |
| $f_3$ | 0.54 | 0.24 | -0.06 | -0.35 | -0.62 | -0.85 | -1.03 | -1.15 | -1.22 | -1.22 | -1.16 | -1.05 | -0.90 | -0.72 | -0.53 |
| $f_4$ | 1.00 | 1.00 | 0.98 | 0.92 | 0.83 | 0.72 | 0.58 | 0.42 | 0.25 | 0.08 | -0.10 | -0.26 | -0.40 | -0.52 | -0.61 |
| $f_5$ | -0.35 | -0.18 | 0.02 | 0.23 | 0.44 | 0.63 | 0.80 | 0.92 | 1.00 | 1.03 | 1.00 | 0.91 | 0.78 | 0.61 | 0.41 |
| $f_6$ | -1.40 | -1.47 | -1.51 | -1.51 | -1.47 | -1.38 | -1.24 | -1.06 | -0.84 | -0.59 | -0.31 | -0.02 | 0.26 | 0.53 | 0.76 |
| $f_7$ | -3.61 | -3.89 | -4.08 | -4.18 | -4.16 | -4.03 | -3.76 | -3.37 | -2.85 | -2.21 | -1.49 | -0.70 | 0.12 | 0.92 | 1.66 |

|       | $\tau_{45}$ | $\tau_{46}$ | $\tau_{47}$ | $\tau_{48}$ | $\tau_{49}$ | $\tau_{50}$ | $\tau_{51}$ | $\tau_{52}$ | $\tau_{53}$ | $\tau_{54}$ | $\tau_{55}$ | $\tau_{56}$ | $\tau_{57}$ | $\tau_{58}$ | $\tau_{59}$ |
|---|---|---|---|---|---|---|---|---|---|---|---|---|---|---|---|
| $f_1$ | 2.96 | 3.03 | 2.97 | 2.80 | 2.53 | 2.19 | 1.83 | 1.45 | 1.10 | 0.79 | 0.54 | 0.34 | 0.20 | 0.11 | 0.06 |
| $f_2$ | 2.30 | 2.39 | 2.37 | 2.24 | 2.04 | 1.78 | 1.49 | 1.19 | 0.90 | 0.65 | 0.44 | 0.28 | 0.17 | 0.09 | 0.05 |
| $f_3$ | -0.34 | -0.16 | -0.01 | 0.10 | 0.18 | 0.23 | 0.24 | 0.22 | 0.19 | 0.15 | 0.11 | 0.08 | 0.05 | 0.03 | 0.02 |
| $f_4$ | -0.67 | -0.69 | -0.68 | -0.64 | -0.58 | -0.51 | -0.42 | -0.33 | -0.25 | -0.18 | -0.12 | -0.08 | -0.05 | -0.03 | -0.01 |
| $f_5$ | 0.21 | 0.01 | -0.16 | -0.29 | -0.37 | -0.41 | -0.41 | -0.38 | -0.32 | -0.25 | -0.19 | -0.13 | -0.08 | -0.05 | -0.02 |
| $f_6$ | 0.95 | 1.08 | 1.15 | 1.15 | 1.10 | 1.00 | 0.87 | 0.71 | 0.56 | 0.41 | 0.29 | 0.19 | 0.11 | 0.06 | 0.03 |
| $f_7$ | 2.31 | 2.81 | 3.14 | 3.29 | 3.26 | 3.06 | 2.73 | 2.31 | 1.85 | 1.40 | 1.00 | 0.67 | 0.41 | 0.24 | 0.12 |

*Figure 8*

DISCRIMINATION METHOD OF A METAL DETECTOR BASED ON TIME CONSTANT SPECTRUM

CROSS-REFERENCE TO RELATED APPLICATIONS

This application is the United States national phase of International Application No. PCT/AU2014/000465 filed Apr. 24, 2014, and claims priority to Australian Patent Application No. 2013901457 filed Apr. 26, 2013, the disclosures of which are hereby incorporated in their entirety by reference.

INCORPORATION BY REFERENCE

The present application claims priority from Australian Provisional Patent Application No. 2013901457 titled "Discrimination Method of a Metal Detector" and filed on 26 Apr. 2013. The content of this application is hereby incorporated by reference in its entirety.

TECHNICAL FIELD

The present invention relates to metal detectors. In a particular form, the present invention relates to metal detectors that have target discrimination capability to detect and discriminate targets in soils.

BACKGROUND

The general forms of most metal detectors are either hand-held battery-operated units, conveyor-mounted units, or Vehicle-mourned units. Examples of hand-held products include detectors used to locate gold, explosive land mines or ordnance, coins and treasure. Examples of conveyor-mourned units include fine gold detectors in ore mining operations, and an example of a vehicle-mounted unit includes a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that processes a receive signal from a measured receive magnetic field, during one or more receive periods during the repeating transmit signal cycle and/or at one or more frequencies to produce an indicator output signal, the indicator output signal at least indicating the presence of at least a metal target within the influence of the transmit magnetic field.

During the processing of the receive signal, the receive signal is either sampled, or synchronous demodulated, to produce one or more target channels, the one or more target channels being further processed to produce the indicator output signal.

Time domain metal detectors typically include pulse-induction ("PI") or pulse-induction like metal detectors, and rectangular current-pulse metal detectors, wherein the receive processing includes sampling of the receive signal and/or synchronous demodulation over selected periods, which may include gain weighting of the samples or synchronous demodulation periods.

Frequency domain metal detectors typically include single or multi-frequency transmission, or pulse transmission with either sine-wave weighted synchronous demodulation, or unweighted synchronous demodulation with pre synchronous demodulation band-pass and/or low-pass filtering.

It is known to demodulate receive signals of a metal detector for processing to characterise the receive signals in terms of time constants. WO/2011/011820 discloses that discrimination of a target to a certain degree can be achieved by analysing the spread of the time constants. Mu-Hsin Wei, Scott, W. R., McClellan, J. H., "Estimation and application of discrete spectrum of relaxations for electromagnetic induction responses," Geoscience and Remote Sensing Symposium, 2009 IEEE International, IGARSS 2009, vol. 2, no pp. II-105, II-108, 12-17 Jul. 2009 discloses that by identifying each of the main frequency components (inversely proportional to time constant) of the received signals, it is possible to enhance discrimination. Mu-Hsin Wei, Scott, W. R., McClellan, J. H., "Landmine detection using the discrete spectrum of relaxation frequencies," Geoscience and Remote Sensing Symposium (IGARSS), 2011 IEEE International, vol., no., pp. 834, 837, 24-29 Jul. 2011 discloses a pre-screener to ignore cases where substantial soil signals are present.

The invention disclosed herein offers an alternative to the prior art for target discrimination.

SUMMARY

According to a first aspect of the present invention, there is provided a method for detecting a target in a soil using a metal detector, including generating a transmit magnetic field for transmission into the soil based on a transmit signal; receiving a receive magnetic field; providing a receive signal induced by the receive magnetic field; processing the receive signal for producing a set of data which has effects of signals from the soil reduced therein or removed therefrom; producing at least two components of a form of at least one time constant spectrum based an the set of data; and producing at least one indicator output signal based on the at least two components for indicating the presence and/or identity of the target when the target is within an influence of the transmit magnetic field.

In one form, the step of processing the receive signal to produce a set of data which has effects of signals from the soil reduced therein or removed therefrom, and the step of producing at least two components of a form of at least one time constant spectrum based on the set of data are effected through the step of using a model of the expected signals from the soil and expected signals from the target; wherein the expected signals from the target is of a form of a response expected from the target with a particular time constant spectrum.

In one form, the indicator output signal indicates a function of a possible identity of the target.

In one form, the set of data is produced through a linear combination of signals from at least two different time periods.

In one form, the set of data is produced through a linear combination of signals from at least two different frequencies.

In one form, the at least two different time periods are defined in a single synchronous demodulation function. In one form, the at least two frequencies are defined in a single synchronous demodulation function.

In one form, the set of data is produced through sampling or demodulation for at least three different time periods or frequencies.

In one form, the transmit signal includes a mono-polar pulse. In one form, the transmit signal includes bi-polar pulses.

In one form, the metal detector is capable of generating the transmit magnetic field and receiving the receive magnetic field using a same coil.

In one form, amplitudes and/or time constants of the at least two components of the form of the at least one time constant spectrum are compared to produce the indicator output signal. In one form, ratios of the amplitudes and/or time constants of the at least two components of the form of the at least one time constant spectrum is calculated to produce the indicator output signal. In one form, a function of the difference between an expected signal, modelled using a forward model, and an actual measured signal of the receive signal is calculated to produce the indicator output signal.

In one form, the two components of the at least one time constant spectrum correspond to a same time constant.

In one form, the step of producing an indicator output signal based on the at least two components includes comparing the at least two components with a predetermined dictionary.

In one form, the dictionary includes more or fewer time constants over a larger or narrower range of time constants depending on a range time constants used to model the target.

In one form, the indicator output signal is a landscape of outputs for pairs of two ranges of time constants.

According to a second aspect of the present invention, there is provided a metal detector capable of performing the method of the first aspect and/or its various forms.

According to a third aspect of the present invention, there is provided a computer readable medium including instructions to perform the method of the first aspect and/or its various forms.

BRIEF DESCRIPTION OF DRAWINGS

Embodiments of the present invention will be discussed with reference to the accompanying drawings wherein:

FIG. 8 depicts a table which has seven vectors corresponding to dictionary functions;

DETAILED DESCRIPTION OF THE INVENTION

In this specification, time constants and frequencies are both used to refer to the characteristic response of an object to the transmitted magnetic field. They are related as $9\pi f = 1/\tau$, where f is frequency and $\tau$ is time constant.

In this specification, the term "channel" will be taken to refer to the example of an output of a process that includes sampling, or synchronous demodulation of the receive signal. The process may also include a low-pass filtering or a high-pass filtering, or both, over a period of time (for example, when the transmit signal being a repeating transmit signal cycle, over one or more transmit cycles).

In this specification, the term "component" is used to refer to a part of a larger whole. When referring to a time constant spectrum, a component of a time constant spectrum means a representation of a particular time constant within the time constant spectrum which may include its amplitude.

The response F(t) in the receive coil from metallic object due to excitation by a voltage impulse in the transmit coil can be represented in the time domain as a weighted sum of real exponential decays as $$F(t) = \delta(t)a_0 + H(t)\sum_i a_i \frac{e^{-t/\tau_i}}{\tau_i}$$

where H(t) is the unit step function, $\delta(t)$ is the Dirac delta function, and the $a_i$'s are the amplitudes of the exponential decays with time constants defined by the $\tau_i$'s.

Equivalently the response $F(\omega)$ in the receive coil from a metallic object can be represented in the frequency domain can also be represented as a weighted sum $$F(\omega) = a_0 + \sum_i \frac{a_i}{1 + j\omega\tau_i}$$

where the $a_i$'s are the amplitudes of the modes with time constants defined by the $\tau_i$'s.

With these representations, we can define the response of a metallic object by specifying a discrete time constant spectrum. That is, a set of amplitudes-time constant pairs. The time constant spectrum of a metallic object depends on its shape, conductivity, and permeability. Thus, an accurate estimation of the time constant spectrum of a metallic object can be used as a means of distinguishing one type of metallic object from another, and from clutter objects. In the following we explicitly omit the determination of the $a_0$ term of the time constant spectrum.

Figure 1:
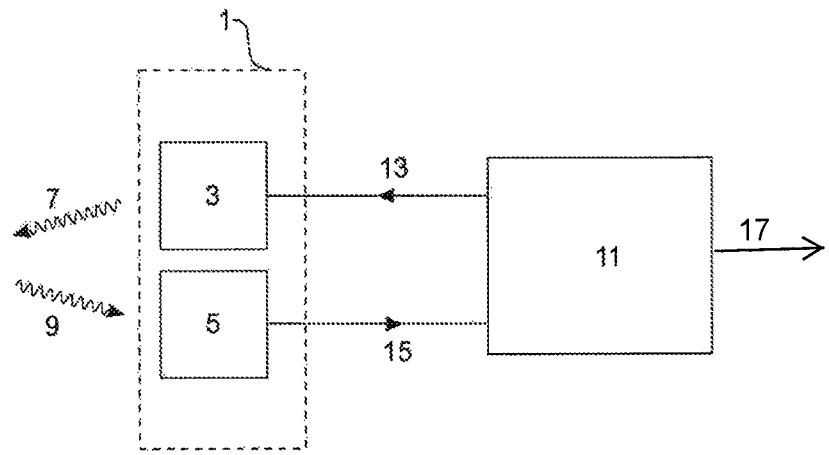
FIG. 1 is a functional block diagram showing the main parts of a metal detector.

FIG. 1 is a functional block diagram showing the main parts of a metal detector. The metal detector includes a sensing head 1, that includes a magnetic field transmitter 3 and a magnetic field receiver 5, to transmit a transmit magnetic field 7 and to receive a receive magnetic field 9, respectively. When the magnetic field transmitter 3 and the magnetic field receiver 5 are separate coils, it is also possible to position them as greatly separated coils (>1 m), depending upon the application of the metal detector, and not necessarily position them together within the sensing head 1. The magnetic field transmitter 3 and the magnetic field receiver 5 can also be in any form and shape known to, and deemed suitable by, a person skilled in the art.

Processing unit 11, which includes transmit and receive electronics, produces a transmit signal 13. In one embodiment, the transmit signal 13 is a repeating transmit signal cycle. The magnetic field transmitter 3, upon receiving the transmit signal 13, generates the transmit magnetic field 7.

The receive signal 15, generated by the receive magnetic field 9 being received by the magnetic field receiver 5, may be amplified and filtered, then processed by the processing unit 11 to produce an indicator output signal 17 indicating a presence of a target under the influence of the transmit magnetic field 7.

While the prior art offers a form of discrimination, the present invention offers an alternative.

In particular, the present invention is a discrimination method that is insensitive to the signals from both resistive and reactive signal components from the soil. It was discovered for the purpose of the present invention that the presence of resistive signal components from the soil may be confused with resistive signal components from metallic targets, and thus identifying the time constant spectrum of the metallic target yields in unsatisfactory results in the presence of substantial resistive signal components from the soil. The discrimination method offered by the present invention is insensitive to both resistive and reactive signal components from the soil, which may also include a component due to a substantially uniform conducting half-space (such as a saline soil).

Figure 2:
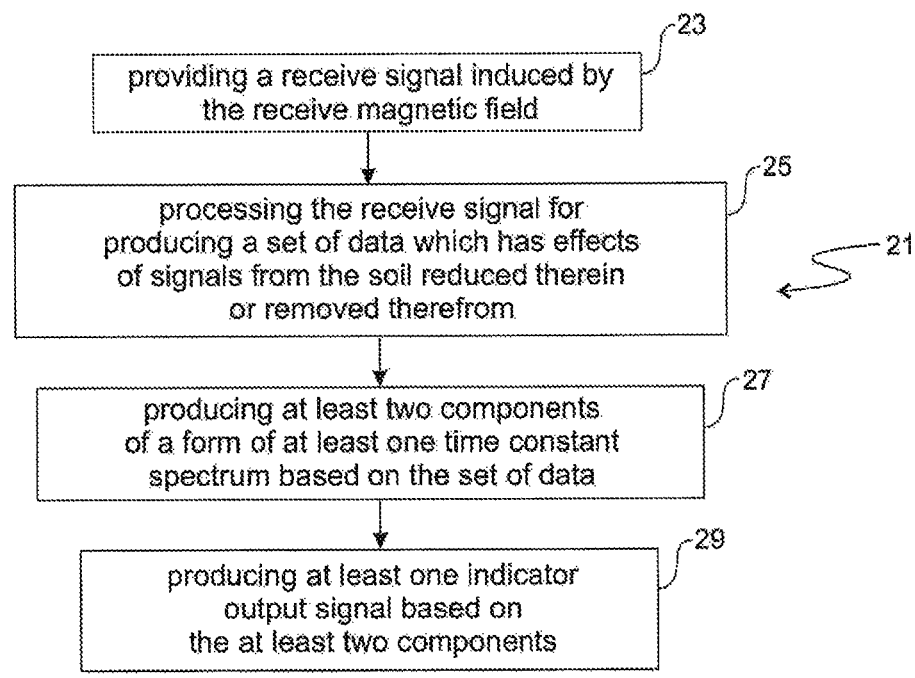
FIG. 2 illustrates the broad concept of the present invention.

FIG. 2 depicts steps 21 involved of the present invention in accordance with one broad aspect of the present invention. The first step 23 involves providing a receive signal induced by the receive magnetic field as received by a magnetic field receiver (e.g. a coil). In other words, a receive signal is obtained through a magnetic field receiver. The second step 25 involves processing the receive signal using a function to produce a set of data which is free from the effects of signals from the soil, or with such effects reduced. In one embodiment, the receive signal is sampled or synchronously demodulated using at least two different sampling functions or synchronous demodulation functions. The functions are selected such that the unwanted signals from the soil do not contaminate at least two components of one form of the time constant spectrum. The functions can define a linear combination of signals from at least two different time periods, or define a linear combination of signals from at least two different frequencies. In one embodiment, the receive signal is converted into digital form, and the digitised data are processed to generate a set of data which is free of the effects of signals from the soil, or with such effects reduced. The third step 27 produces the at least two components of the at least one form of the time constant spectrum based on the data. In the fourth step 29, an indicator output signal is produced. In one embodiment, the indicator output signal indicates the presence and/or identity of the target when the target is within an influence of the transmit magnetic field. Ratios of the at least two components of the form of the dine constant spectrum may be calculated to produce the indicator output signal. Alternatively, magnitudes of the at least two components of the form of the time constant spectrum are compared to produce the indicator output signal. In another way, a function of the difference between an expected signal, modelled using a forward model (for example one that is described herein) and the actual measured signal is calculated to produce the indicator output signal. Usually, the produced time constant spectrum is assumed to accurately represent the true time constant spectrum in this way.

In one embodiment, the second step 25 and the third step 27 can be effected in a single step. This can be achieved by, for instance, fitting a model of the combined soil response and target response to the receive signal wherein the target response is of the form of that response expected from a target with a particular time constant spectrum, which may be parametrised in terms of the amplitudes and time constants or Limo constant spectrum of its components. The fourth step 29 could then be effected in a number of ways. In one embodiment, the receive signal can be compared against the model of the combined soil response and target response in order to ascertain the degree of similarity between the model and the receive signal.

A metric used to measure the goodness of fit between the model and the receive signal can be used to determine the degree of similarity. A well known example of such a metric is the mean squared error. In this case we may calculate the mean squared error between the model and the receive signal. However, other metrics could be used, such as the mean absolute error, or other metrics which may penalise violation of some imposed constraints which are typically physically motivated. Alternatively, a number of different models of the combined soil response and target response can be compared to the receive signal, and in each case the degree of similarity can be ascertained. With the target modelled in a parametrised manner, the parameters controlling the amplitudes and time constants and/or time constant ranges of the components of its time constant spectrum may also be adjusted so that the degree of similarity of the model to the receive signal can be changed. In one embodiment, an indicator output can be produced which is a function of the degree of similarity of each of a set of models to the receive signal.

It is known that an indicator output signal can be produced based upon a one-component approximation of a time constant spectrum which is also insensitive to signals from the soil. In the present invention we produce indicator output signals based on at least a two-component approximation of a time constant spectrum which is also insensitive to signals from the soil. Using an at least two-component approximation of a time constant spectrum offers advantages over using only a one-component approximation of a time constant spectrum.

One advantage is that it gives more information about the target, and therefore it confers a greater discrimination capacity. For instance, two different targets may have the same one-component approximated time constant spectrum, but they have different two-component approximated time constant spectra. Therefore, using a two component approximated time constant spectrum may allow these two targets to be distinguished from each other. Furthermore, the eddy current modes which correspond to these time constants may induce voltages at different relative amplitudes depending on the angle that the search head presents to the target. For instance, interrogating the target with the search head from the top of the target may induce its first eddy current mode more than its second eddy current mode, whereas interrogating the target with the search head from the side of the target may induce its first eddy current mode less than its second eddy current mode. In the first case, the time constant spectrum of the target would have two components with two different time constants, the first of greater amplitude than the second. In the second case, the time constant spectrum of the target would have the same two components as in the first case, the first of similar amplitude than the second. So, although we see that the ratios of amplitudes of the two components are different in the two cases, the time constants of the two components are the same. The fact that, in the second case, the time constants are the same allows for the target to be identified with the same identity from either the top or the side. In contrast, using a one-component approximation of the time constant spectrum usually leads to the approximation being a type of average of the two components, which is different depending on the relative amplitudes of the two components, and the orientation of the target.

The correct identification of buried objects regardless of orientation is important since identical objects are oriented differently under the ground. For instance, many landmines settle in the ground in different orientations, or are intentionally buried in different orientations. In one embodiment, a classifier could be used to determine the identity of the target based on the indicator output. There are many ways of manifesting a classifier. Examples of classifiers include decision trees, ensembles (boosting and bagging) of decision trees, support vector machines, k-nearest neighbours, and neural networks. These classifiers could be trained using measured or simulated data of the same form as the indicator outputs of the present invention. Alternatively they could learn, in an unsupervised manner, those objects that give indicator outputs that are similar to one another. These examples of how as classifier may be used to estimate the identity of a target should not be seen as limiting. There are many other variations of how to use a classifier, such as those well-known in the field of machine learning.

Figure 3:
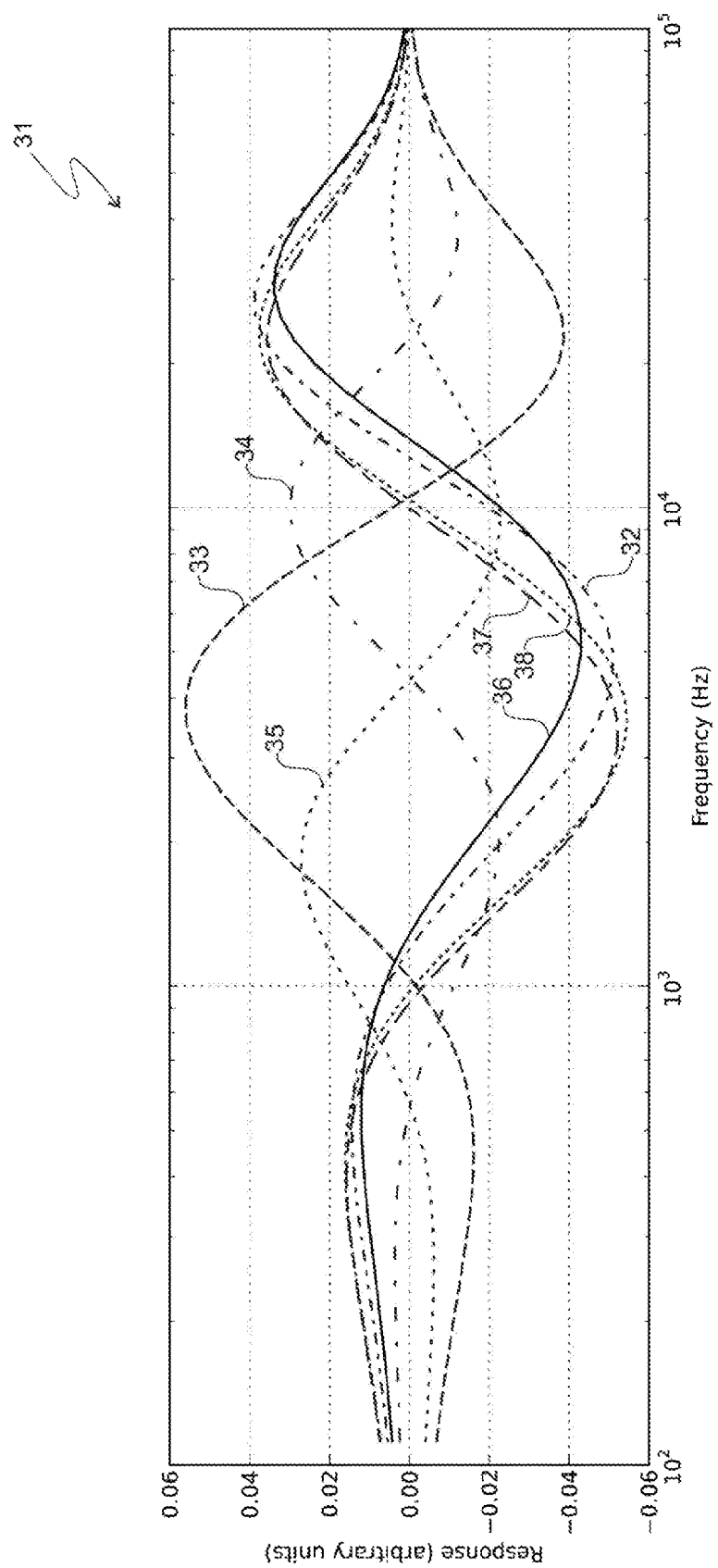
FIG. 3 depicts an example of seven channel responses.

Reference is now made to FIG. 3 to describe one embodiment of the present invention.

In this embodiment, the metal detector is exemplified as a PI detector. The repeating transmit signal cycle or waveform of this PI detector can be mono-polar, or bi-polar. The same concept can be applied to other detectors as well, for examples, detectors and waveforms taught in Australian Patent Applications Nos. 2009262370, 2007272230, 2001079376, 2001079439, 2001079440 and 2004290091.

This PI detector includes at least two soil-insensitive channels. A soil-insensitive channel is designed to have an output responsive to metallic targets but not sensitive to signals from the soil. This can be achieved by having a demodulation function that is not sensitive to signals from the soil. For example, a single demodulation function Which is in effect linearly combining high, medium, low frequency components of the signal, by either synchronous demodulation or sampling, to substantially cancel log-uniform frequency dependent signal components from soil and/or log-linear frequency dependent signal components from soil and/or signal components from uniform conducting half space. Examples of functions to produce soil-insensitive channels are disclosed in Australian Patent Applications Nos. 1990047963, 2007304831 and 2009243482.

Each channel, post-demodulation using a demodulation function, produces a set of data for further processing.

The receive period is a period during which signals from targets are received and processed, and is a period during which the reactive voltage across the magnetic field transmitter of the detector is approximately zero. One or more target channels can be produced by sampling or demodulating during the receive period.

Generally, the more target channels a detector produces, the more noise the detector can tolerate and still be able to produce an accurate time constant spectrum. There are many possible representations of a time constant spectrum, some being: a magnitude as a function of time constant/frequency for a receive signal; an average of time constant magnitude of several channels; a measure of spread of time constant/frequency spectrum etc.

In this embodiment, there is a total of seven channels which are demodulated with demodulation functions that cancel log-uniform and log-linear frequency dependent signal components from the soil. They could also cancel the conductive signal component from the soil. The demodulation functions are constructed in ways taught by Australian Patent Application Nos. 2007304831 and 2009243482.

The seven target channels are insensitive to log-uniform and log-linear frequency dependent signal components from the soil, but respond to targets with different single time constants in a predictable way. Plot 31 of FIG. 3 shows exemplary forms 32, 33, 34, 35, 36, 37 and 38 of the response of these channels as function of frequency of time constant as related by $2\pi f=1/\tau$.

Knowing the response of the channels as a function of frequency for targets with only a single time, constant component, a forward model of the received signal for targets with more than one time constant component can be determined. The forward model is a model which can produce predictions of a response from a specified target given the time constant spectrum of that target.

For example, consider a specific target having two time constants, $\tau_1$ and $\tau_2$, that produce, in the receive circuit, respective components of the receive signal having amplitudes $a_1$ and $a_2$, respectively. The response of the ith channel, to the target expressed as a function of time constant, can be represented by $f_i(\tau)$. Thus, the response $r_i$ of this channel to the target can be expressed as:

$$r_i = a_1 f_i(\tau_1) + a_2 f_i(\tau_2). \quad (1)$$

Since there is a plurality of channels, there will be multiple such responses. The vector of responses, for a seven channel detector, can be expressed as:

$$r = \begin{bmatrix} r_1 \\ r_2 \\ r_3 \\ r_4 \\ r_5 \\ r_6 \\ r_7 \end{bmatrix} \quad (2)$$

The aim is to find an acceptable solution to the inverse problem of (1), that is, given the response vector r, determine $\tau_1$ and $\tau_2$ as well as $a_1$ and $a_2$.

There are various ways to solve such inverse problem. One of the simplest, effective ways of solving this inverse problem is a brute force search of the parameter space, or a partial search to reduce the problem of (1) to a linear system.

For example, one may construct an over-complete dictionary of responses of the extant channels to possible target frequency values corresponding to time constants. The use of an over-complete dictionary is commonly used for sparse signal recovery. In one embodiment, the dictionary includes vectors of responses to sixty logarithmically spaced target frequencies between 100 Hz and 100 kHz. However, the dictionary may include more or fewer frequencies over a larger or narrower range of frequencies, depending upon the detail with which one wishes to model metallic targets.

One can choose two particular of the sixty frequencies within the range, then calculate what their respective amplitudes must be to most accurately reproduce the response vector. There is a choice of measures of the most accurate, or "best-fit", solution. In this embodiment the sum of the squared residuals as the measure of the goodness of fit is chosen. That is, those values of $a_1$ and $a_2$ which give the minimum value of the objective function $u^T u$ are calculated:

$$\min_{a_1,a_2} u^T u \qquad (3)$$

where u is the residual vector, and $u=r-(a_1 f(\tau_1)+a_2 f(\tau_2))$. The lower the value of this mean-squared error, the more accurate is the fit.

Variables that are vectors are written in bold font. We assume that the amplitudes $a_n$ must all be of the same sign. This is true for a mono-loop coil, and approximately true for an induction balanced coil; close to the coil, this assumption will not hold, but far from the coil, it is approximately true. This assumption allows a constraint to be applied to the solution:

$$\operatorname{sign}(a_1)=\operatorname{sign}(a_2) \qquad (4)$$

Alternatively, one could solve the problem twice, once with the constraint:

$$a_1, a_2 \geq 0 \qquad (5)$$

and once with the constraint $$a_1, a_2 \leq 0 \qquad (6)$$

Alternatively, if one knew the sign of the signals in advance, as one does when a mono-loop coil is used, one may solve the problem only once, with the appropriate inequality constraint.

With these constraints, (3) can be solved, for example, as a quadratic program with inequality constraints.

The same calculation is performed for every pair of frequencies. In this case, the above problem could be solved 60×60 times, in practice, since it is not necessary to consider the ordering of $\tau_1$ and $\tau_2$, some of the solutions will be redundant. Accordingly, the problem needs to be solved 60×61/2 times.

In any case, the end result is a landscape consisting of the minimum value of $u^T u$ for each choice of pairs of time constants $\tau_1$ and $\tau_2$.

Figure 4:
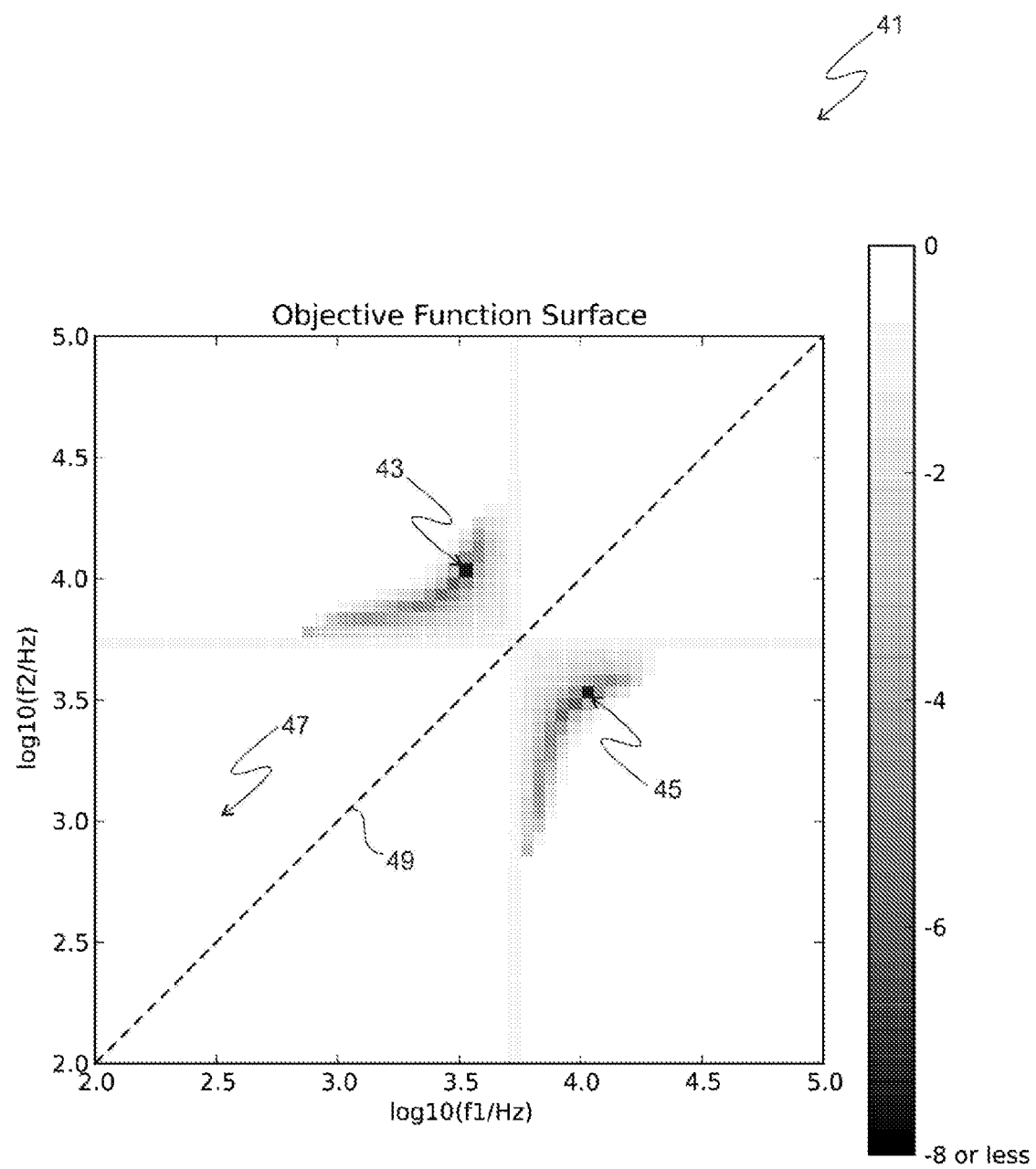
FIG. 4 depicts a result based on the channel responses of FIG. 3.

FIG. 4 depicts a result of ln $u^T u$ obtained through the steps described above. Landscape 41 shows that there are two smallest objective functions (shown at 43 and 45). However, since the ordering of f1 and f2 or and $\tau_1$ and $\tau_2$, is irrelevant, the landscape is actually symmetrical as indicated by the line of symmetry 49. Thus, there is a unique objective function or "best-fit" spectrum 43 or 45. Region 47, with the faintest shades, indicates that the target is unlikely to have a time constant spectrum approximated by the time constant pairs therein.

It is then possible to present the information in one of the many possible forms of time constant spectrum. It is useful to present a form of a time constant spectrum as it can be used to identify characteristics of a detected metallic object. These characteristics can be used to discriminate one type of metallic target from other types of metallic targets, where the metallic targets can be of different shapes and compositions.

In one embodiment, one could display a likelihood of the target having a particular pair of time constants of interest. In another embodiment, one could display only those regions of the landscape that are of interest, masking out regions of the landscape that are not of interest.

Figure 5:
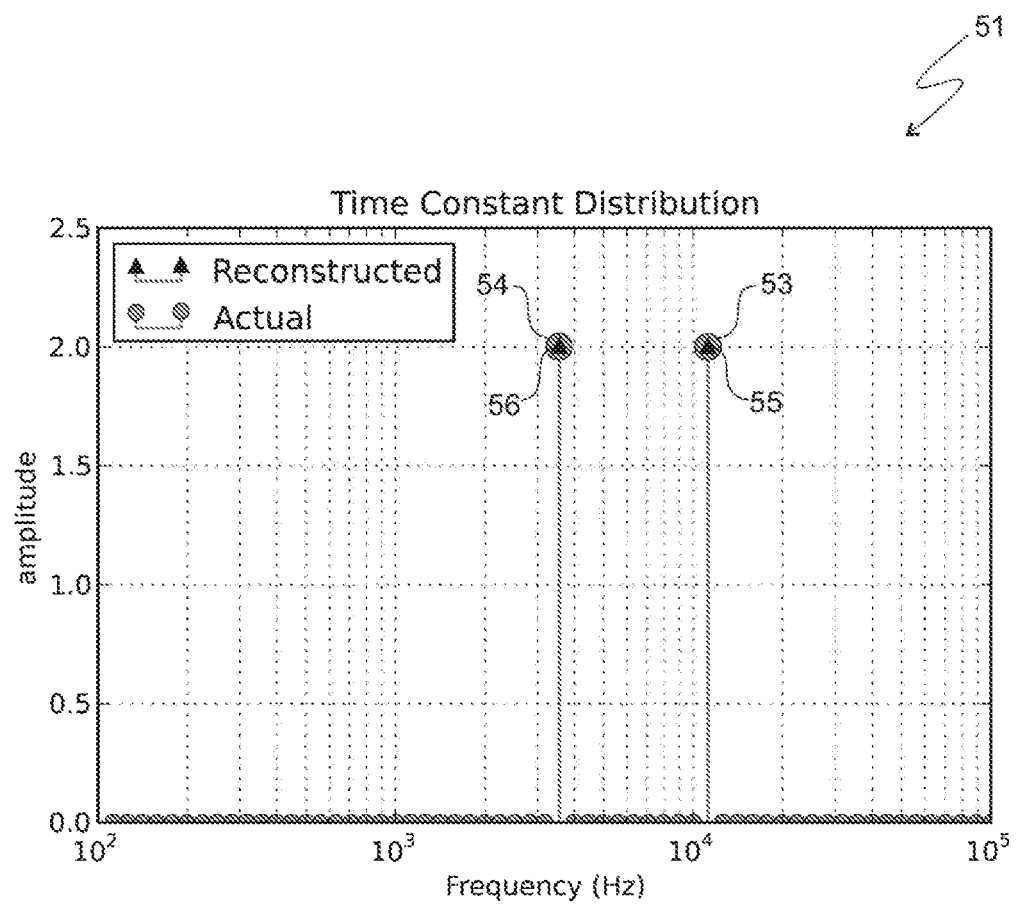
FIG. 5 depicts a comparison of reconstructed and best-fit time constant spectrum (distribution)

FIG. 5 is a comparison of a simulation of the calculation of the relative amplitudes and values of a pair of time constants with the predicted response of an embodiment to a target with two distinct time constants. In yet another embodiment, one could display the best-fit pair of time constants and their calculated amplitudes in a manner similar to the time constant time constant spectrum 51 of FIG. 5. In FIG. 5, it can be seen that the best-fit pair of calculated time constants (reconstructed) 53 and 54 is almost exactly equal to the actual pair of time constants 55 and 56 in the simulated target. The signal-to-noise ratio in this case is 60 dB.

One could choose to perform the above method at every sample (for example, at 100 samples per second), or one could aggregate data over some period, then perform the above method on the aggregation, for example, aggregating the data until a few hundred milliseconds after a detection event has occurred, then process the data and display the results.

Although the brute-force search performs the best, other approaches can be used to solve the inverse problem. Variations on the brute-force search include choosing a subset of the parameter space, either randomly or by some other method, to be evaluated. Other approaches can be used, for example, non-linear programming with constraints such as inequality constraints and/or equality constraints, or least squares with constraints and/or regularization such as L0, L1, and L2 regularization. Other examples of methods which could be used to solve the inverse problem include elastic net, matching pursuit, and meta-heuristics such as simulated annealing, genetic algorithms, and differential evolution. Some information can also be extracted from the solution using a method of unconstrained least squares.

There are many other approaches one could take to solving the inverse problem, although many do not extensively search the parameter space to produce a landscape as shown earlier. For example, a non-linear, constrained least squares method could be used to solve for both a set of time constants and their corresponding amplitudes. Such a method would converge to a best-fit solution in a relatively small number of iterations after exploring only a small fraction of the parameter space of feasible solutions. In this case, the possible indicator outputs which could be produced are more limited in scope than would be the case were a larger fraction of the parameter space of feasible solutions explored.

Figure 6:
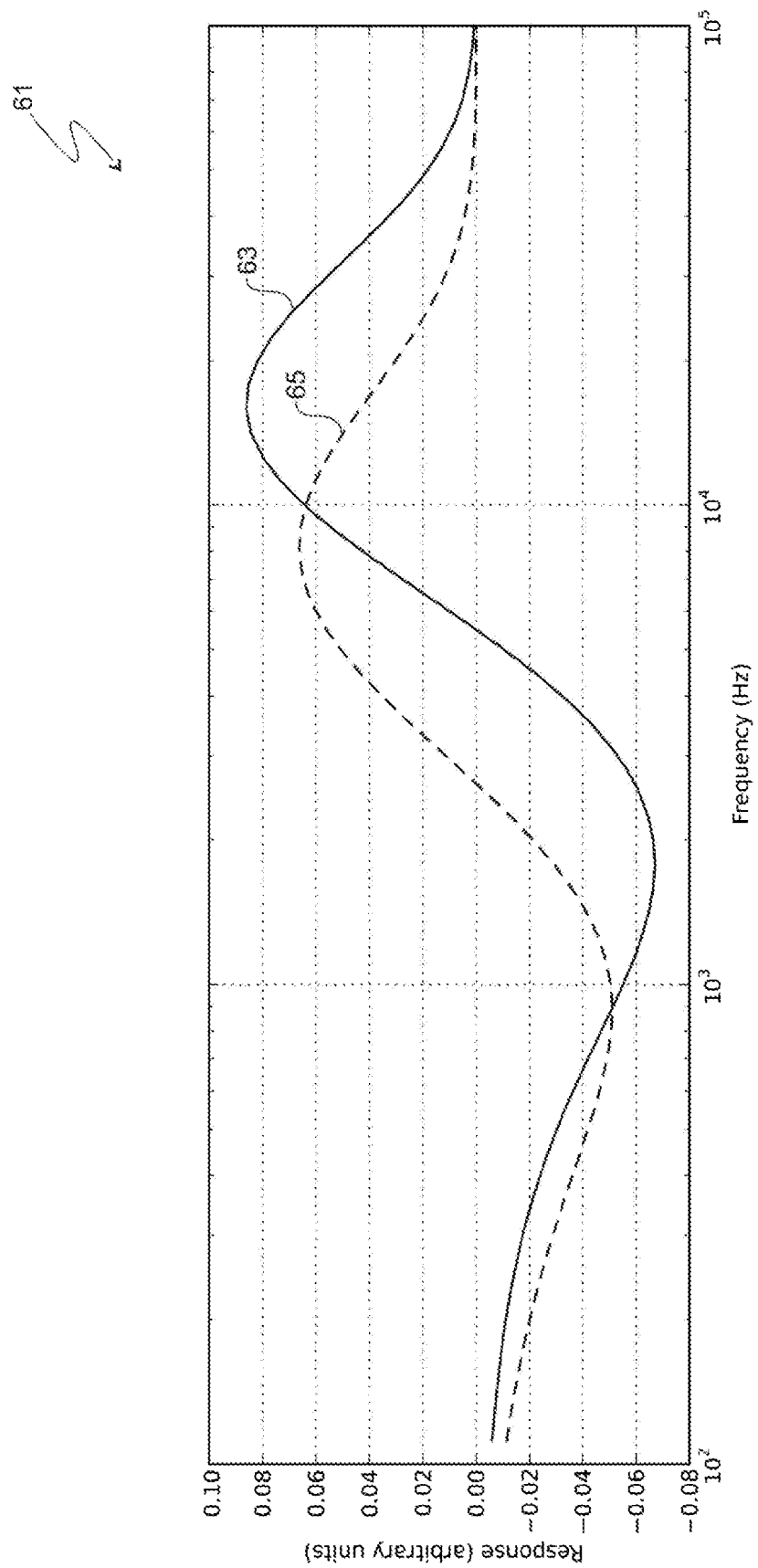
FIG. 6 depicts an example of two channel responses.

While FIGS. 4 and 5 depict aspects of an embodiment having seven channels, it is not a necessity to have seven channels to perform the present invention; at a minimum, only two channels are required. In one embodiment having two channels, both channels are ground cancelling channels, and their sensitivity curves are exemplified in plot 61 of FIG. 6. Curves 63 and 65 are example responses and of the two channels as function of frequency or, equivalently, time constant.

Figure 7:
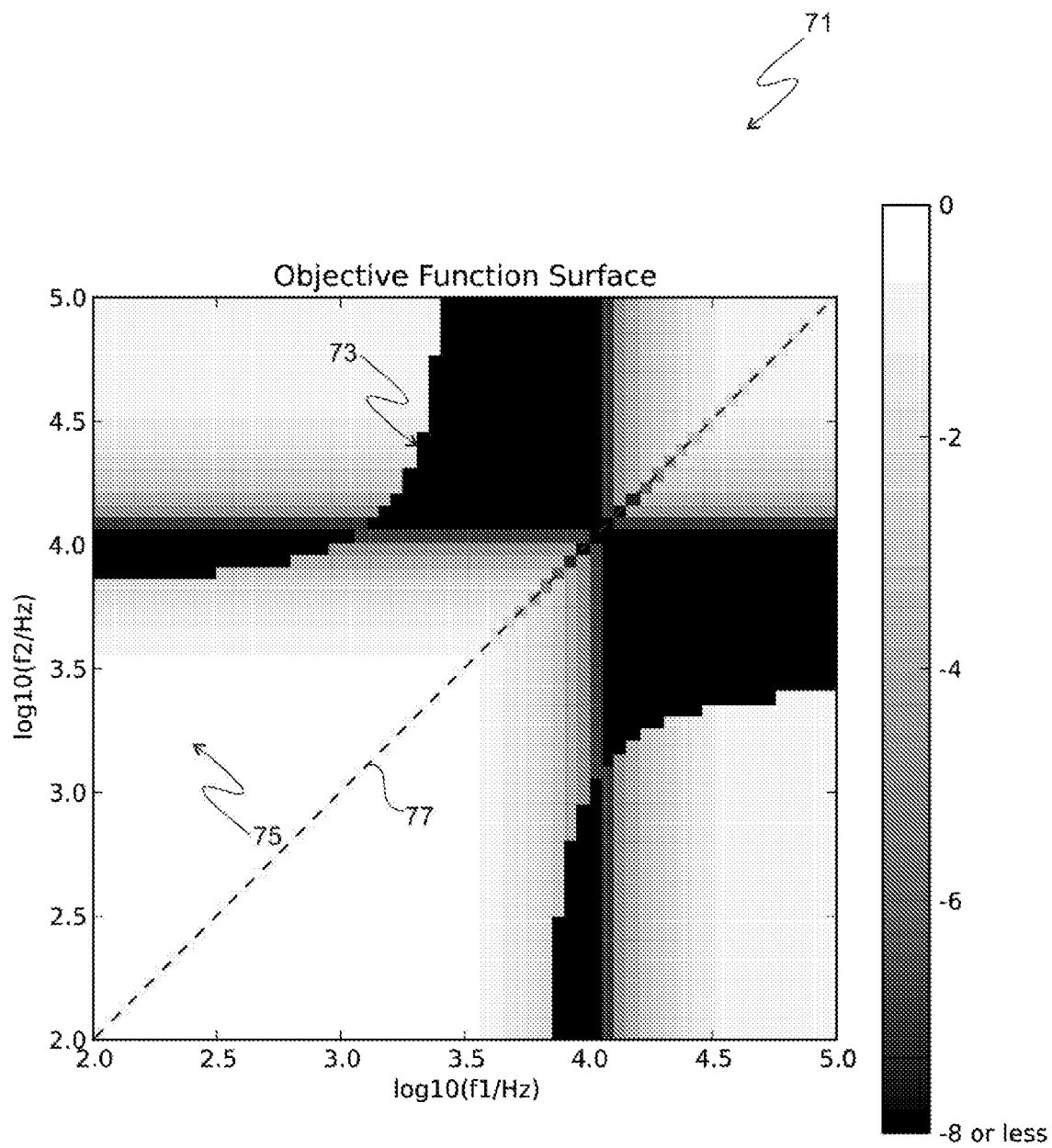
FIG. 7 depicts a result based on the channel responses of FIG. 6.

As in the embodiment with seven channels, one could solve the cardinality constrained inverse problem, restricting the estimated time constant spectrum to an approximation based on only two time constants, by brute-force search of the parameter space of time constant pairs. For each pair, one could calculate an objective function, as the sum of the squared differences between the measured signals and the expected signals according to some forward model, given the best-fit spectrum defined by best-fit amplitudes for both time constants, producing an objective function landscape. FIG. 7 depicts the objective function landscape.

It can be noted from landscape 71 of FIG. 7 that there is a large region of the parameter space where the objective function is very small 73. This is because with the great majority of targets, two channels do not give enough information to provide a unique solution to the inverse problem.

In this case, it is not possible to select a unique "best-fit" spectrum, since there is a family of spectra which are all equally "best-fitting". Nonetheless, even with only two channels, one would have enough information to exclude a large amount of the parameter space. For instance, one could conclude from FIG. 7 that the target spectrum does not lie in the regions of the parameter space where the objective function is large, such as the region 75 indicated. That is, the target is unlikely to have a time constant spectrum approximated by the time constant pairs in region 75 of the objective function landscape. Similar to FIG. 4, there is a line of symmetry 77.

In this way, although one cannot uniquely identify the time constant spectrum with only two channels, one can still rule out a large proportion of the parameter space. Thus in practice, it is still beneficial to apply the invention when there are only two channels in a system with the benefits of reduced requirements of processing power and circuit complexity at the expense of more accurate results.

In this embodiment, an indicator output can be produced that is the objective function landscape itself, as in FIG. 7. Alternatively, a feature of the objective function landscape could be used as an indicator output, such as a function of the particular pair of time constant and/or corresponding amplitudes which correspond to a particular value on the objective function landscape, such as the lowest value. Alternatively, a function of the value of the objective function for a particular pair of time constants that is chosen according to some scheme could be used to produce an indicator output.

For a frequency domain detector, the present invention can be applied without changes apart from how the receive signal is sampled or demodulated to obtain the set of data for further processing. In particular, rather than having time periods for sampling or demodulation, a frequency-domain detector will have frequencies. The signals sampled or demodulated in different frequencies produce the required set of data for the present invention. The set of data has the effects of signals from the soil reduced or eliminated and is further processed to produce at least two components of a form of at least one time constant spectrum based on the set of data.

A practical usage of having just two channels is in landmine detection. Using only two channels reduces computational complexity, cost, and complexity of the electronic circuits required. The user may be searching for as particular type of landmine, with a characteristic time constant spectrum. If a target is detected, then the objective function landscape can be calculated. If the objective function landscape indicates that the detected target is unlikely to have the spectrum of the particular type of landmine that the user is looking for, then the user may decide to retrieve the target more rapidly and with less caution than would otherwise be prudent.

In one embodiment, the repeating transmit waveform is of a mono-polar pulse, for example, a cycle of negative low-voltage period, positive high-voltage period, zero-voltage period. In this case, the receive signal is sampled or demodulated for at least three different time periods or frequencies for each cycle to produce channel which is insensitive to signals from the soil. In another embodiment where the repeating transmit waveform is bi-polar, for example, a cycle of negative low-voltage period, positive high-voltage period, zero-voltage period, positive low-voltage period, negative high-voltage period, zero-voltage period, only two different time periods or frequencies are required.

Below is an example of numeral calculation with seven channels. In this example, suppose we have as vector of measured responses, given as:

$$r = \begin{bmatrix} -7.36 \\ -6.16 \\ -1.23 \\ 1.81 \\ 1.28 \\ -3.41 \\ -10.19 \end{bmatrix} \quad (7)$$

Also suppose that we define the expected responses to each time constant $\tau_1$, in a dictionary of time constants, for each channel j as $f_j(\tau_1)$. FIG. 8 shows a representative table having seven vectors, each vector having 60 elements, and corresponding to the dictionary functions $f_j(\tau_1)$). The $f_j$ correspond to the channels plots of FIG. 3.

One can then choose a pair of time constants and evaluate the objective function $u^T u$. Say we choose the pair of time constants $\tau_{30}$ and $\tau_{40}$.; in this case, the expected response vector is given as a linear combination of the expected responses for each time constant:

$$\hat{r} = a_{30} f(\tau_{30}) + a_{40} f(\tau_{40}) \quad (8)$$

$$= a_{30} \begin{bmatrix} -4.42 \\ -3.45 \\ 0.54 \\ 1.00 \\ -0.35 \\ -1.40 \\ -3.61 \end{bmatrix} + a_{40} \begin{bmatrix} 0.73 \\ 0.39 \\ -1.16 \\ -0.10 \\ 1.00 \\ -0.31 \\ -1.49 \end{bmatrix}$$

where $a_{30}$ and $a_{40}$ are free parameters that can be written as the vector $a = [a_{30}\ a_{40}]^T$.

We then fit this model of the expected response vector to the measured response vector, determining the best-fit values of $a_{30}$ and $a_{40}$. We perform this determination by solving a quadratic program with inequality constraints given as:

Minimize g(a) (with respect to a)

where $$g(a) = u^T u \quad (9)$$
$$= (r - \hat{r})^T (r - \hat{r})$$
$$= (r - (a_{30} f(\tau_{30}) + a_{40} f(\tau_{40})))^T (r - (a_{30} f(\tau_{30}) + a_{40} f(\tau_{40})))$$

subject to a≥0 where $$a = \begin{bmatrix} a_{30} \\ a_{40} \end{bmatrix}$$

and the bolded zero in the inequality is a 2×1 vector of zeros.

The solution to this quadratic program can be calculated using a least squares method with non-negative parameters. The solution is:

$$a = \begin{bmatrix} 2.00 \\ 1.99 \end{bmatrix} \quad (10)$$

For this value of a the objective function $u^T u$ is 0.0023.

We could choose another pair of time constants and repeat this calculation, determining the best-fit value of a and the corresponding value of the objective function $u^T u$. For example, we can choose the pair of time constants $\tau_{10}$ and $\tau_{35}$. For this choice of time constants, the solution to the quadratic program is:

$$a = \begin{bmatrix} 0 \\ 2.55 \end{bmatrix} \quad (11)$$

where $a_{10}$ has been set to zero due to the non-negativity constraint. Note that this also changes the value of $a_{35}$, as the unconstrained solution is $a=[-1.19 \; 2.17]^T$. For the value of a in (11), the value of the objective function $u^T u$ is 1.21.

Since the value of $u^T u$ for time constants $\tau_{30}$ and $\tau_{40}$ is less than the value of $u^T u$ for time constants $\tau_{10}$ and $\tau_{35}$ we may conclude, for example, that the time constants $\tau_{30}$ and $\tau_{40}$ better approximate the time constants in the target than do the time constants $\tau_{10}$ and $\tau_{35}$. Alternatively, we could calculate the value of $u^T u$ for every pair of time constants in the dictionary, then we could construct an indicator output which represents that time constant spectrum, consisting of the two time constants and their corresponding amplitudes, having the lowest value of $u^T u$.

Referring back to FIG. 2, step 25 of "processing the receive signal for producing a set of data which that has the effects of signals from the soil reduced therein or removed therefrom" and step 27 of "producing at least two components of a form of at least one time constant spectrum based on the set of data" are inter-related. In fact, both steps are required to achieve a good performance in metal detection. It is possible to skip step 25 in a situation where the signals from the soil are very small compared to the signals from the target. However, in many real situations the signals from the soil are significant compared to the signals from the target. This is true when operating in highly mineralised soil conditions, and where targets are located deep underground such that the signal received from the target is very small, the signals from ground can greatly exceed those from the targets.

When the signals from the soil are comparable to the signals from the target, it is not possible to determine which part of the received signal is due to the soil and which part is due to the target. If we assume that all components of the received signal are due to the target, then we will deduce that the target which produced this signal has a time constant spectrum that is different than that of the actual target.

To illustrate the point, consider the simple case when we have three channels, S, M, and L, responding particularly to short time constant targets, medium time constant targets, and long time constant targets, respectively. Now suppose that L responds to soils more than does M, which responds to soils more than does S. When these channels respond to a medium time constant target only, M will contain more signal than S and L. From this, we can deduce roughly that the target is a medium time constant target. However, when these channels respond to a medium time constant target and soil simultaneously, the soil may give significant signal such that L contains more signal than M, which contains more signal than S. In this case, one could erroneously deduce that the target has predominantly long time constants.

The following presents an analysis of the importance of steps 25 to 27. In this example, a response vector of measured responses is given as $$r = \begin{bmatrix} 1.32 \\ 1.00 \\ -0.29 \\ -0.28 \\ 0.11 \\ 0.39 \\ 1.04 \end{bmatrix} + \begin{bmatrix} -0.76 \\ -0.40 \\ 1.00 \\ 0.06 \\ -0.47 \\ 0.07 \\ 0.37 \end{bmatrix} = \begin{bmatrix} 0.56 \\ 0.60 \\ 0.71 \\ -0.22 \\ -0.36 \\ 0.46 \\ 1.51 \end{bmatrix} \quad (12)$$

This response vector is the response expected from a target with time constants $\tau_{10}$ and $\tau_{20}$, from the table in FIG. 8, with amplitudes such that both components give unit response. That this, $$r = a_{10} f(\tau_{10}) + a_{30} f(\tau_{20}) \quad (13)$$

where $a_{10} = a_{20} = 1$

If the time constant spectrum is approximated as having two components with two time constants then the expected response can be modelled as $$\hat{r} = a_i f(\tau_i) + a_j f(\tau_j) \quad (14)$$

where $a_i$ and $a_j$ can take any positive value and $f(\tau_i)$ and $f(\tau_j)$ are taken from the dictionary of response vectors in the table in FIG. 8.

For a particular combination, of $f(\tau_i)$ and $f(\tau_j)$, the amplitudes $a_i$ and $a_j$ can be evaluated according to how closely the expected response vector resembles the measured response Vector by calculating the sum of squared residuals metric $$g(a_i, a_j, f(\tau_i), f(\tau_j)) = u^T u = \quad (15)$$
$$(r - \hat{r})^T (r - \hat{r}) = (r - (a_i f(\tau_i) + a_j f(\tau_j)))^T (r - (a_i f(\tau_i) + a_j f(\tau_j)))$$

The combination, which yields the lowest value of $g(a_i, a_j, f(\tau_i), f(\tau_j))$ corresponds to the model of the target expected to produce a response vector more closely resembling, in the least-squares sense, the measured response vector.

The solution to this mixed discrete-continuous optimization problem is as expected by design, given by $a_i=1$, $a_j=1$, $f(\tau_i)=f(\tau_{10})$, and $f(\tau_j)=f(\tau_{20})$, which corresponds to the minimum value of the objective function $g(a_i=1, a_j=1, f(\tau_i)=f(\tau_{10}), f(\tau_j)=f(\tau_{20}))=0$.

Figure 9:
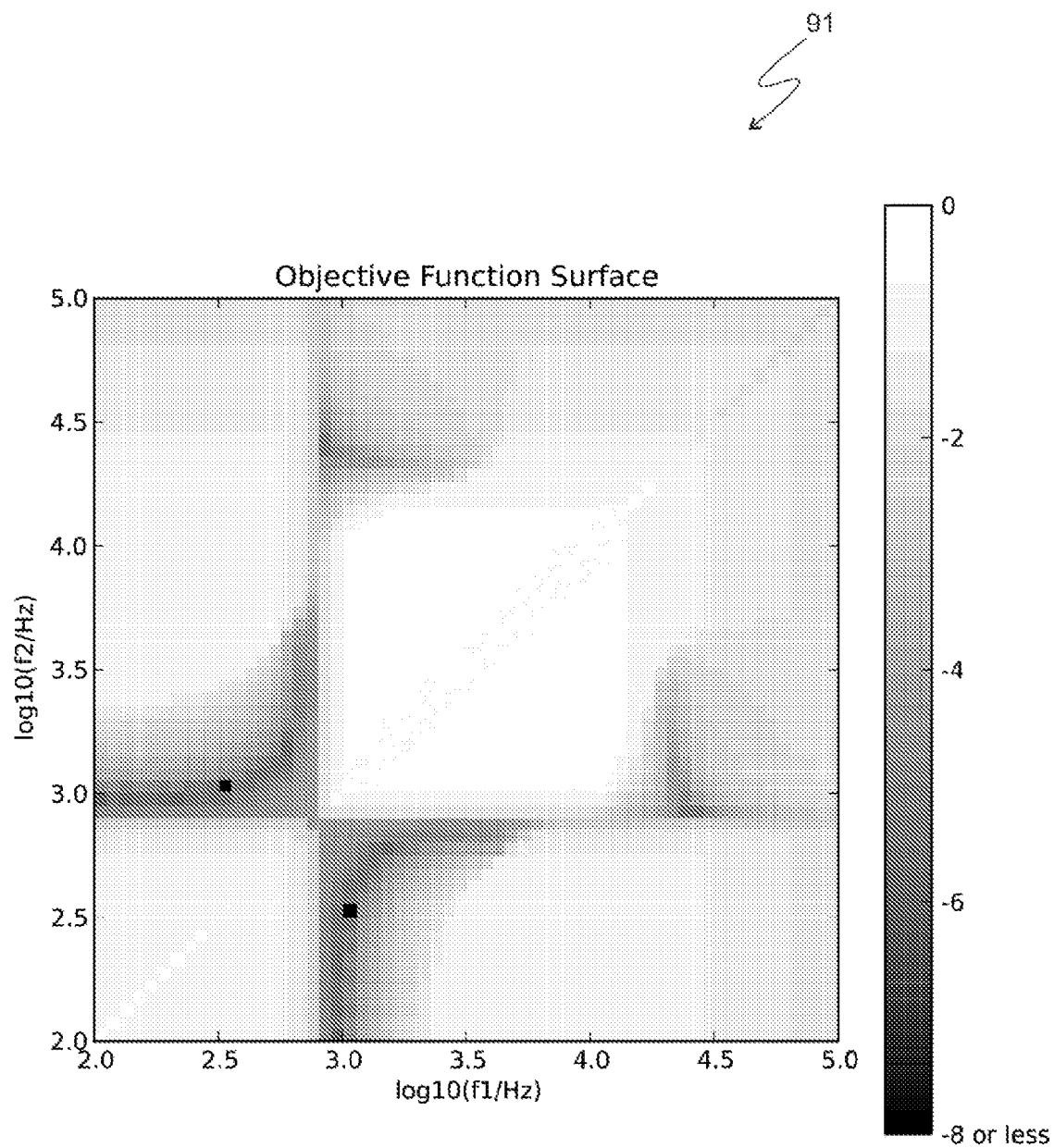
FIG. 9 shows the objective function landscape obtained through a set of data which has effects of signals from the soil reduced therein or removed therefrom.
Figure 10:
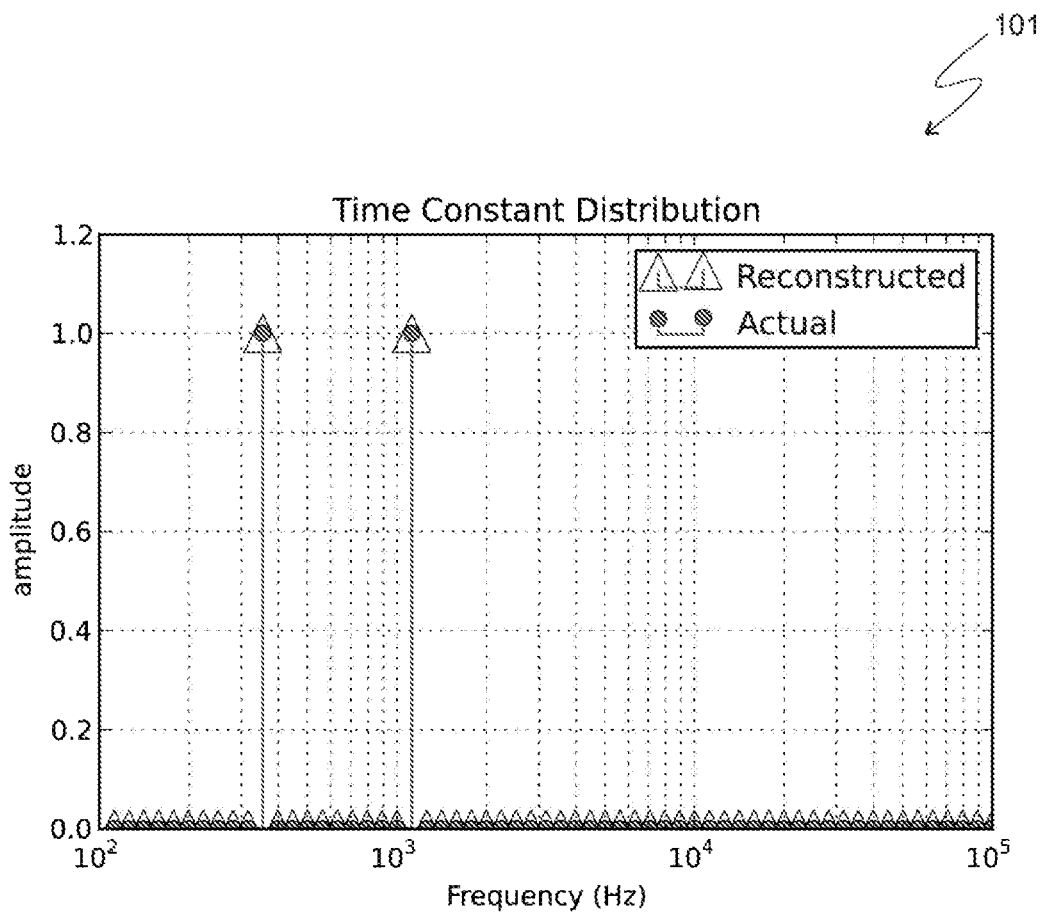
FIG. 10 shows the best-fit time constant spectrum obtained through a set of data which has effects of signals from the soil reduced therein or removed therefrom.

FIG. 9 shows the objective function landscape 91 and FIG. 10 shows the best-fit time constant spectrum 101. These results are obtained through a set of data which has effects of signals from the soil reduced therein or removed therefrom. The objective function landscape 91 shows two conclusive results; it can be seen from 101 that the reconstructed best-fit pair of time constants matches the actual pair of time constants representing the simulated target.

The following is an example measured response vector without effects of signals from the soil reduced therein or removed therefrom.

$$r = \begin{bmatrix} 1.32 \\ 1.00 \\ -0.29 \\ -0.28 \\ 0.11 \\ 0.39 \\ 1.04 \end{bmatrix} + \begin{bmatrix} -0.76 \\ -0.40 \\ 1.00 \\ 0.06 \\ -0.47 \\ 0.07 \\ 0.37 \end{bmatrix} + \begin{bmatrix} 1.00 \\ 1.00 \\ 1.00 \\ 1.00 \\ 1.00 \\ 1.00 \\ 1.00 \end{bmatrix} = \begin{bmatrix} 1.56 \\ 1.60 \\ 1.71 \\ 0.78 \\ 0.64 \\ 1.46 \\ 2.41 \end{bmatrix} \quad (16)$$

This response vector is the sum of response expected from a target with time constants $\tau_{10}$ and $\tau_{20}$, as in the previous example, 8 plus the response expected from some arbitrary soil represented by the vector of unit response in each channel. That this, $$r = a_{10}f(\tau_{10}) + a_{20}f(\tau_{20}) + a_{soil}f(\text{soil}) \quad (17)$$

where $a_{10} = a_{20} = 1$, $a_{soil} = 1$, and $$f(\text{soil}) = \begin{bmatrix} 1.00 \\ 1.00 \\ 1.00 \\ 1.00 \\ 1.00 \\ 1.00 \\ 1.00 \end{bmatrix}.$$

Figure 11:
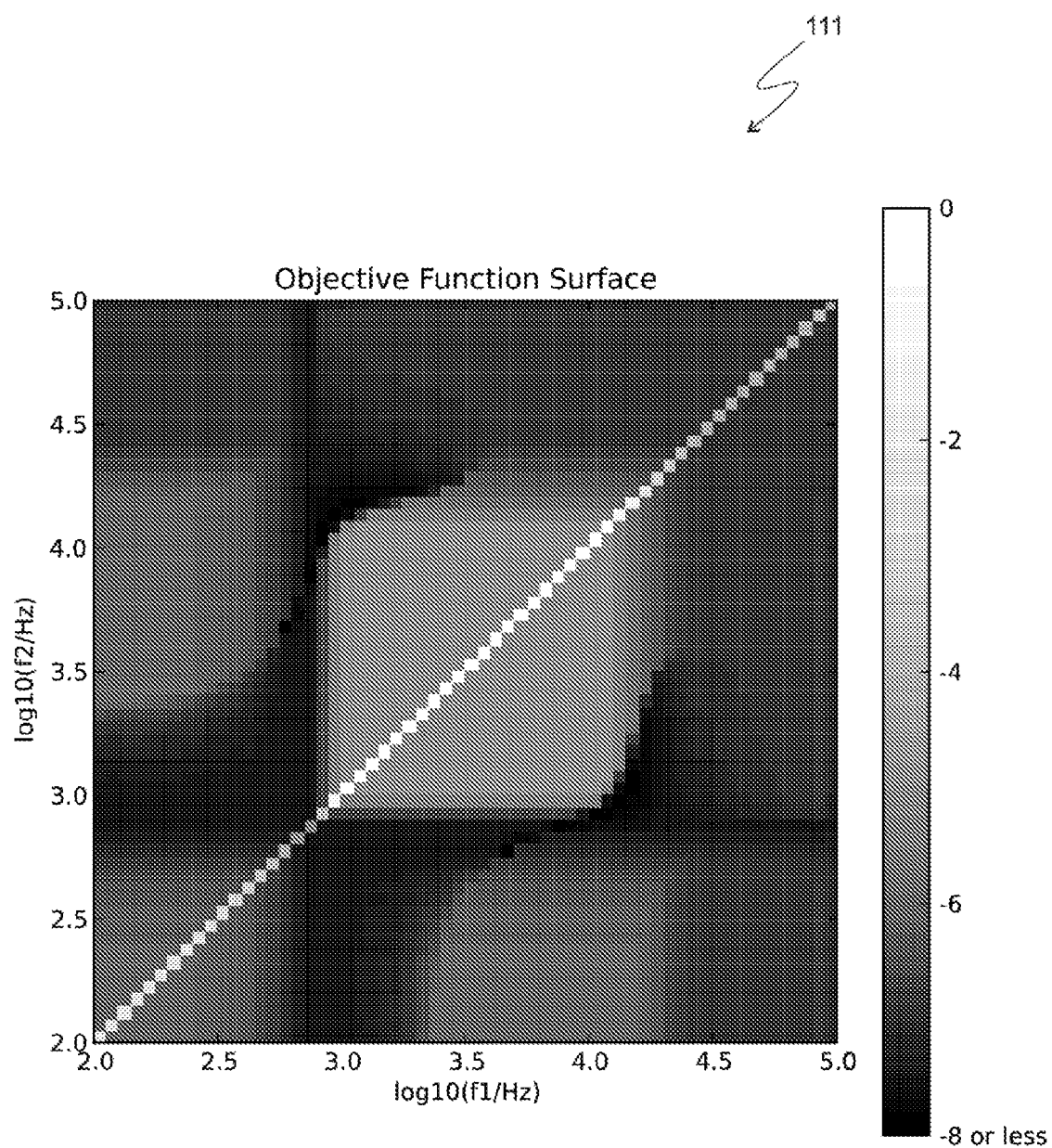
FIG. 11 shows the objective function landscape obtained through a set of data affected by presence of signal from the soil.
Figure 12:
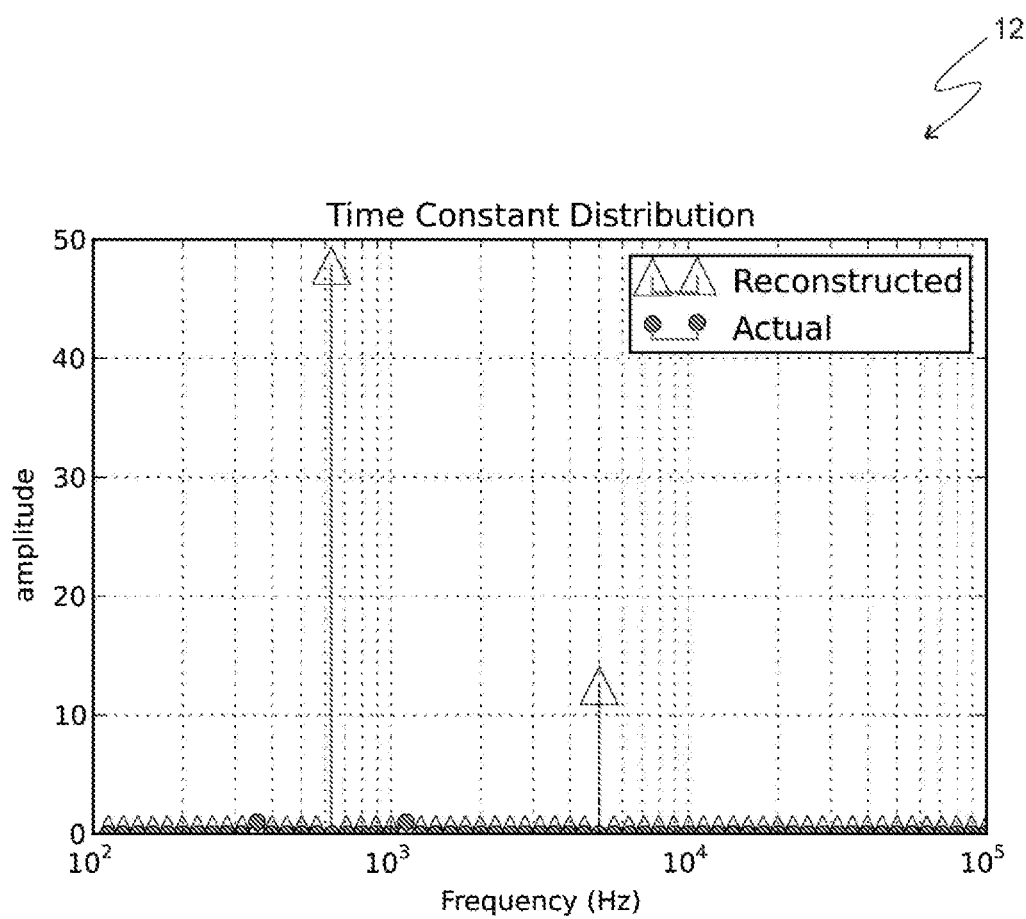
FIG. 12 shows the best-fit time constant spectrum obtained through a set of data affected by presence of signal from the soil.

Now, if the mixed discrete-continuous optimization problem is solved as before, the solution is given by $a_i = 47.79$, $a_j = 12.48$, $f(\tau_i) = f(\tau_{15})$, $f(\tau_j) = f(\tau_{33})$ which corresponds to the minimum objective function value of 1.092. Clearly, the best-fit target model is very different to the actual target. The presence of signal from the soil has severely distorted the estimated target spectrum. The objective function landscape is shown in FIG. 11, and the best-fit dine constant spectrum 121 is shown in FIG. 12. The objective function landscape 111 is somewhat inconclusive; and it can be seen in FIG. 12 that the reconstructed best-fit pair of time constants does not match the actual pair of time constants representing the simulated target. This shows the importance of having a set of data has the effects of signals from the soil reduced or removed.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external, to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for detecting a target in a soil using a metal detector, comprising:
    generating a transmit magnetic field, using a transmit coil, for transmission into the soil based on a transmit signal;
    receiving a receive magnetic field, using a receive coil, to provide a receive signal induced by the receive magnetic field;
    processing the receive signal, using a processor, for producing a set of data which has effects of signals from the soil reduced therein or removed therefrom;
    producing, using the processor, at least two components of a form of at least one time constant spectrum based on the set of data to represent the target; and
    producing, using the processor, at least one indicator output signal based on the at least two components for indicating at least one of a presence and an identity of the target when the target is within an influence of the transmit magnetic field;

wherein each of the at least two components corresponds to a time constant within the at least one time constant spectrum.

2. The method of claim 1, wherein the step of processing the receive signal to produce a set of data which has effects of signals from the soil reduced therein or removed therefrom, and the step of producing at least two components of a form of at least one time constant spectrum based on the set of data are effected in a single process by using a model of the expected signals from the soil and expected signals from the target; wherein the expected signals from the target is of a form of a response expected from the target with a particular time constant spectrum.

3. The method of claim 1, wherein the set of data is produced through a linear combination of signals from at least two different time periods.

4. The method of claim 3, wherein the at least two different time periods are defined in a single synchronous demodulation function.

5. The method of claim 1, wherein the set of data is produced through a linear combination of signals from at least two different frequencies.

6. The method of claim 5, wherein the at least two frequencies are defined in a single synchronous demodulation function.

7. The method of claim 1, wherein the set of data is produced through sampling or demodulation for at least three different time periods or frequencies.

8. The method of claim 7, wherein the transmit signal comprises a mono-polar pulse.

9. The method of claim 8, wherein the metal detector is configured to generate the transmit magnetic field and receiving the receive magnetic field using a same coil.

10. The method of claim 1, wherein the transmit signal comprises bi-polar pulses.

11. The method of claim 1, wherein at least one of amplitudes and the time constants of the at least two components of the form of the at least one time constant spectrum are compared to produce the indicator output signal.

12. The method of claim 11, wherein the two components of the at least one time constant spectrum correspond to a same time constant.

13. The method of claim 1, wherein ratios of at least one of the amplitudes and the time constants of the at least two components of the form of the at least one time constant spectrum is calculated to produce the indicator output signal.

14. The method of claim 1, wherein the indicator output signal is based on (a) an expected signal, modelled using a forward model, and (b) an actual measured signal of the receive signal.

15. The method of claim 1, wherein the step of producing an indicator output signal based on the at least two components comprises comparing the at least two components with a predetermined dictionary.

16. The method of claim 15, wherein the dictionary comprises more or fewer time constants over a larger or narrower range of time constants depending on a range time constants used to model the target.

17. The method of claim 1, wherein the at least one indicator output signal forms a 3-axis plot, with two axes being a relation of frequencies and a third axis is a function of the at least one indicator output signal.

18. A metal detector configured to perform the method of claim 1.

19. A non-transitory computer readable medium comprising instructions to perform the method of claim 1.

* * * * *